United States Patent
Pang

(10) Patent No.: US 9,868,078 B2
(45) Date of Patent: Jan. 16, 2018

(54) LARGE-SIZED PLATE PRESSURE FILTER

(71) Applicant: FOSHAN JINKAIDI FILTRATION EQUIPMENT CO., LTD., Guangdong (CN)

(72) Inventor: Zhongda Pang, Guangdong (CN)

(73) Assignee: FOSHAN JINKAIDI FILTRATION EQUIPMENT CO., LTD., Foshan (CN)

( * ) Notice: Subject to any disclaimer, the term of this patent is extended or adjusted under 35 U.S.C. 154(b) by 0 days.

(21) Appl. No.: 14/893,959

(22) PCT Filed: Nov. 26, 2013

(86) PCT No.: PCT/CN2013/087838
§ 371 (c)(1),
(2) Date: Nov. 25, 2015

(87) PCT Pub. No.: WO2014/190694
PCT Pub. Date: Dec. 4, 2014

(65) Prior Publication Data
US 2016/0114266 A1 Apr. 28, 2016

(30) Foreign Application Priority Data

May 28, 2013 (CN) .......................... 2013 1 0205237

(51) Int. Cl.
*B01D 25/12* (2006.01)
*B01D 25/30* (2006.01)
(Continued)

(52) U.S. Cl.
CPC ........... *B01D 25/12* (2013.01); *B01D 25/164* (2013.01); *B01D 25/215* (2013.01); *B01D 25/302* (2013.01)

(58) Field of Classification Search
CPC .... B01D 25/12; B01D 25/302; B01D 25/215; B01D 25/164; B01D 2201/34–2201/347
See application file for complete search history.

(56) References Cited

U.S. PATENT DOCUMENTS 3,656,622 A * 4/1972 Heimbach ............ B01D 25/215
                                                              210/231
3,807,567 A * 4/1974 Iwatani ................ B01D 25/127
                                                              210/225

(Continued)

FOREIGN PATENT DOCUMENTS

CN          1047982 A    12/1990
CN          2170797 Y     7/1994

(Continued)

OTHER PUBLICATIONS

Pang—CN—101524896 ESPACENET translation.*

(Continued)

*Primary Examiner* — David C Mellon
*Assistant Examiner* — Liam Royce
(74) *Attorney, Agent, or Firm* — Viering, Jentschura & Partner mbB

(57) ABSTRACT

A pressure filter includes a hydraulic device, a pressing device, and two filter plates. A guide beam is fixed to the hydraulic device and the pressing device. The hydraulic device has a piston rod movably mounted on the guide beam. The piston rod is connected to a push plate. The filter plates are mounted on the guide beam. The push plate and the pressing device are disposed at two sides of the set of the filter plates. The pressing device has a first feed inlet. The push plate has a second feed inlet. Each filter plate has a material through hole. Two adjacent filter plates are connected end to end. The material through hole forms a material channel. The first and second feed inlets both (Continued)

communicate with the material channel. The feed speed is greatly increased and the filter effect is also improved.

9 Claims, 5 Drawing Sheets

(51) Int. Cl.
  *B01D 25/21*   (2006.01)
  *B01D 25/164*  (2006.01)

(56) References Cited

U.S. PATENT DOCUMENTS

| | | | |
|---|---|---|---|
| 4,217,224 A | * | 8/1980 | Fismer ................ B01D 25/215 |
| | | | 210/231 |
| 4,251,373 A | | 2/1981 | Nakamura |
| 5,741,419 A | * | 4/1998 | Baxter ............... B01D 25/1275 |
| | | | 210/227 |

FOREIGN PATENT DOCUMENTS

| | | |
|---|---|---|
| CN | 2193195 Y | 3/1995 |
| CN | 2461637 Y | 11/2001 |
| CN | 101172205 A | 5/2008 |
| CN | 201124048 Y | 10/2008 |
| CN | 101524896 A | 9/2009 |
| CN | 201329205 Y | 10/2009 |
| CN | 102701643 A | 10/2012 |
| CN | 202893017 U | 4/2013 |
| CN | 103272418 A | 9/2013 |
| DE | 2915388 A1 | 7/1980 |
| EP | 0827766 A1 | 3/1998 |
| EP | 1759752 A1 | 3/2007 |
| GB | 163105 A * | 5/1921 ........... B01D 25/302 |
| JP | S48-83457 | 11/1973 |
| JP | S53-145160 A | 12/1978 |
| JP | S59-73012 A | 4/1984 |
| JP | H08281016 A | 10/1996 |
| JP | 2000167315 A | 6/2000 |
| JP | 2008132429 A | 6/2008 |
| KR | 20130016966 A | 2/2013 |
| WO | 2005097288 A1 | 10/2005 |

OTHER PUBLICATIONS

CN—202893017U—MT STIC translation.*
International Search Report based on application No. PCT/CN2013/087838 (5 pages + 3 pages English translation) dated Mar. 6, 2014.
Chinese Office Action based on application No. 201310205237.9 (5 pages) dated Sep. 25, 2014 (Reference Purpose Only).
Japanese Office Action based on application No. 2016-512196 (8 pages) dated Jun. 21, 2016 (Reference Purpose Only).
German Search Report based on application No. 11 2013 007 126.6 (6 pages) dated Nov. 14, 2016 (Reference Purpose Only).

* cited by examiner

LARGE-SIZED PLATE PRESSURE FILTER

RELATED APPLICATIONS

The present application is a national stage entry according to 35 U.S.C. §371 of PCT application No.: PCT/CN2013/087838 filed on Nov. 26, 2013 which claims priority from Chinese application No.: 201310205237.9 filed on May 28, 2013, and is incorporated herein by reference in its entirety.

TECHNICAL FIELD

Various embodiments relate to pressers, and more particularly to a pressure filter.

BACKGROUND

Pressure filters are commonly used to industrially process drainage for the purpose of environmental protection. Drainage containing sludge is processed by a pressure filter and separated into solid leach residue and water that is less muddy. Such dry leach residue occupies space much smaller than the drainage, and can be easily disposed through incineration or landfilling like normal waste. The solid-free water can be recycled, further processed and reused, or drained directly.

The existing pressure filter, when used, has its filter plates pressed together and wrapped by filter cloth. Closed space is formed between the filter cloth covering the adjacent filter plates. Then drainage is fed into the closed space through the central holes of the filter plates. Since the drainage comes with high pressure, water is pushed through the filter cloth and drained form the pressure filter through water channels formed inside the filter plates. On the other hand, sludge is blocked by the filter cloth, and accumulated in the closed space between the adjacent filter plates. Having the sludge being accumulated to a certain amount, once the filter plates are released, the sludge compressed into cakes can drop out the filter cloth between the filter plates. With more and more attention focused on environmental protection and energy conservation, pressure filters are increasingly popular as they can turn large-volume drainage into small-volume filter cakes, which means significantly reduced costs for drainage process and more economic and social advantages. It is clear through the foregoing process that efficiency and effectiveness are two major measures to assess a pressure filter. While the former refers to how many tons of drainage is processed by a given pressure filter in a given time period, the latter means how low the water content in the resultant filter cakes is. All improvements made for a pressure filter are about one or both of the issues.

All of the existing pressure filters are designed as having a single feed inlet. This makes the feed speed and in turn the working efficiency limited. In the recently developed large-sized pressure filters, the length of filtering section is significantly increased. As a result, in the process of filtering drainage, it is common that when the filter plate closer to the feed inlet has seen sludge dried and accumulated by gravity, the filter plate far away from the feed inlet have not received any sludge. This difference causes uneven pressing and may be responsible to premature wear of components.

Presently, most filter plates have a diameter below 0.6 m. Although an enlarged filter plate may be more productive of processed sludge, and even double the working efficiency, its larger diameter brings about some solid problems. First, the greater the diameter is, the longer the circumference is. This means it is more difficult to press adjacent filter plates into a reliable sealing condition. Particularly, after removal of filter cakes, there is always some residue sticking in the sealing structure between the filter plates. In practice, one pressure filter typically has about a dozen of heavy, bulky filter plates, and it is very likely that manual clean unintentionally misses some residue. However, such residue may prevent the sealing condition from forming between the filter plates. In this case, drainage with sludge will leak from the failed sealing structure directly and escape from the filter cloth. Secondly, the pressure acting on the filter plate is equal to the product of multiplying the pressure intensity of the drainage by the area of the filter plate. That means the greater the diameter of the filter plate is, the larger the pressure of drainage acting on the filter plate is. Thus, in the pressing and filtering process, each filter plate impacted by rush of drainage at its two sides tends to sway acutely. In the event that the filter plate is not strong enough, it will break and soon reach the end of its service life.

SUMMARY

The primary objective of the present disclosure is to provide a pressure filter, which provides improved efficiency and effectiveness when pressing and filtering drainage.

For achieving the foregoing objective, the present disclosure implements the technical schemes as described below.

A pressure filter comprises a hydraulic device, a pressing device, and at least two filter plates, wherein a guide beam spans across the hydraulic device and the pressing device and has two ends thereof fixed at two ends of the assembly of the hydraulic device and the pressing device, respectively, the hydraulic device having a front end provided with a piston rod, the piston rod being movably mounted on the guide beam, the piston rod having a front end connected to a push plate, the filter plates being tandem mounted on the guide beam as a group so that the push plate and the pressing device are located at two ends of the group of the filter plates, respectively, and the pressure filter being characterized in that the pressing device is provided with a first feed inlet, and the push plate is provided with a second feed inlet, wherein each of the filter plates has a material through hole, and the adjacent two filter plates are connected end to end so that the material through holes jointly form a material channel and the first and second feed inlets are both communicated with the material channel.

The first feed inlet extends horizontally, and the second feed inlet extends vertically from above to the material through hole.

The first feed inlet and the second feed inlet are each provided with a valve.

The filter plate has two sides thereof peripherally provided with different ridges each formed as a closed loop, so that when two said filter plates are pressed together, the ridges at contacting sides of the adjacent filter plates are offset to jointly define a vacant space therebetween.

The ridge at one of the sides of the filter plate has a flat top surface and the ridge at the other side the filter plate has a pointy or curved top surface.

When two said filter plates are pressed together, the vacant space formed between the flat top surface of the ridge of one of the filter plates and the pointy or curved top surface of the ridge of the other filter plate is closed, wherein the ridge having the flat top surface forms an inner-circle sealing and the ridge having the pointy or curved top surface forms an outer-circle sealing.

The vacant space has a width ranging between 3 mm and 5 mm, and columnar protrusions are evenly distributed all over each of the sides of the filter plate, so that when two said filter plates are pressed together, the corresponding braces on the adjacent filter plates press against each other.

At each of the sides of the filter plate, columnar protrusions are evenly distributed all over an area circled by the ridge, and all of the columnar protrusions have top surfaces thereof level with each other, wherein a base level of the filter plate from which the columnar protrusions are extended outward becomes thicker as it goes toward a periphery of the filter plate, and the columnar protrusion near the periphery of the filter plate has a height smaller a height of the columnar protrusion far away from the periphery of the filter plate.

The braces are grouped into an inner circle and an outer circle depending on radial positions thereof on the filter plate, wherein the inner circle contains four said braces, whose diameter ranges between 30 mm and 50 mm, and the outer circle contains six said braces, whose diameter ranges between 50 mm and 70 mm.

Therein, a diameter of the outer circle of the braces is 40-60% of a diameter of the filter plate, and a diameter of the inner circle of the braces is 20-30% of the diameter of the filter plate.

Since the two feed inlets are located at the two ends of the group composed of all of the filter plates, the drainage with sludge is fed at the two ends simultaneously. This means not only significantly improved efficiency of feeding but also evener pressing and filtering. The filter plate is provided with ridges at its two sides so that when two filter plates are pressed together, the ridges at the contacting sides of the filter plates jointly form a vacant space with a predetermined volume. Therefore, if there is residue remaining at the sealing structure between the filter plates, when the filter plates are pressed together, the vacant space serves to receive the residue and prevent the sealing condition from degrading.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The disclosure as well as a preferred mode of use, further objectives and advantages thereof will be best understood by reference to the following detailed description of illustrative embodiments when read in conjunction with the accompanying drawings.

Figure 1:
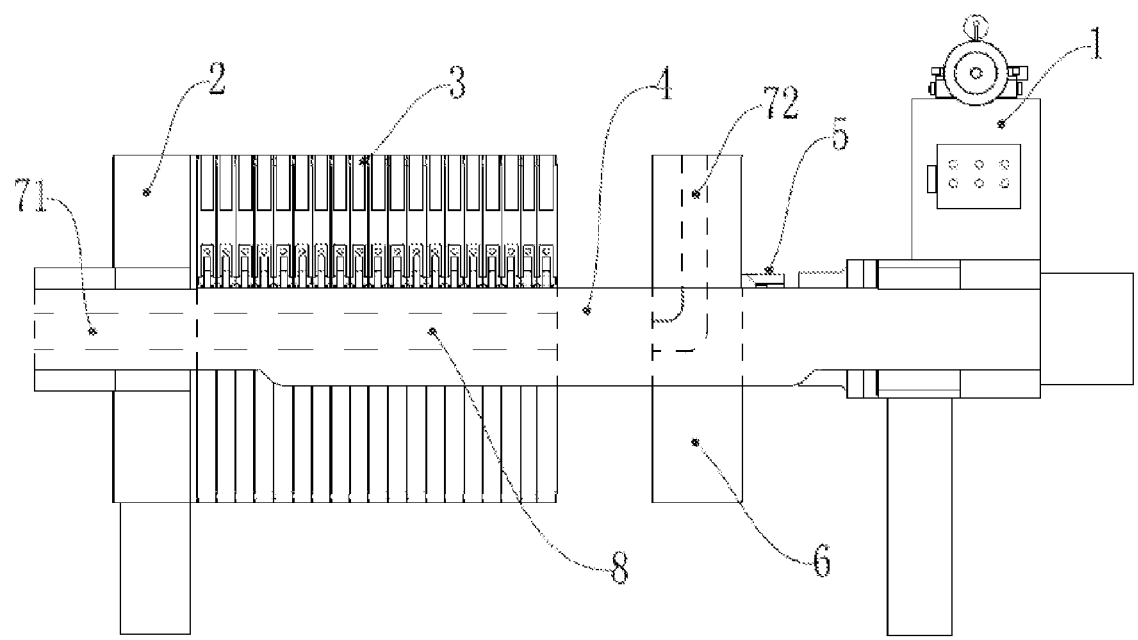
FIG. 1 is a schematic drawing of a pressure filter according to one embodiment of the present disclosure.

The disclosed pressure filter, as shown in FIG. 1, comprises a hydraulic device 1, a pressing device 2, and at least two filter plates 3. A guide beam 4 spans across the hydraulic device 1 and the pressing device 2 and has its two ends fixed at two ends of the assembly of the hydraulic device 1 and the pressing device 2, respectively. The hydraulic device has its front end provided with a piston rod 5. The piston rod 5 is movably mounted on the guide beam 4. The piston rod 5 has its front end connected to a push plate 6. The filter plates 3 are tandem mounted on the guide beam 4 as a group so that the push plate 6 and the pressing device 2 are located at two ends of the group of the filter plates 3, respectively. The pressing device 2 is provided with a first feed inlet 71, and the push plate 6 is provided with a second feed inlet 72. Each of the filter plates 3 has a material through hole 31. The adjacent two filter plates 3 are connected end to end so that the material through holes 31 jointly form a material channel 8. The first feed inlet 71 and the second feed inlet 72 are both communicated with the material channel 8.

Preferably, the first feed inlet 71 extends horizontally, while the second feed inlet 72 extends vertically from above to the material through hole 31 of the closest filter plate 3. Since the second feed inlet 72 is formed within the push plate 6, and the opposite end of the push plate 6 is connected to the piston rod 5 and in turn the hydraulic device 1, the second feed inlet 72 formed as a vertical shaft directly communicated to the material through hole 31 helps for saving space that would otherwise be occupied by an additional, separate feed pipe, so as to contribute to significantly reduce the overall length of the filter. This means economization on not only space but also building material. On the other hand, since there is nothing to be installed at the front end of the first feed inlet 71, the first feed inlet 71 may be simply conquered to extend horizontally, thereby minimizing the manufacturing costs.

Preferably, the first feed inlet 71 and second feed inlet 72 are each provided with a valve. The valve can be closed right after feeding, so as to cut off the communication between the exterior of the pressure filter and the material channel 8, thereby increasing the pressure inside the pressure filter and improving the filtering efficiency.

In operation, the hydraulic device 1 is first activated to make the piston rod 5 push the push plate 6 to press and hold the rearmost filter plate 3 and in turn the group of the filter plates forward. Then sludge to be processed is fed simultaneously from the first feed inlet 71 and the second feed inlet 72 to the material channel 8 composed of the material through holes 31, and flood among the filter plates 3. Afterward, the valves at the first and second feed inlets 71, 72 are closed. The hydraulic device 1 is now activated again to make the piston rod 5 further push the push plate 6 to compress the group of the filter plates 3, thereby dehydrating the solid leach residue. After pressing, the hydraulic device 1 drives the piston rod 5 to withdraw the push plate 6, so the filter plates 3 return to their initial positions for making it possible to remove the leach residue among the filter plates 3. Since the two feed inlets are located at the two sides of the group of the filter plates 3, the feeding operation performed simultaneously at the two inlets has its efficiency almost twice as that achieved by a single inlet. Since the feeding operation is more efficient, the group of the filter plates 3 can be sooner filled with sludge, thereby eliminating the problem about pressing inequality caused by precipitation of sludge.

Figure 2:
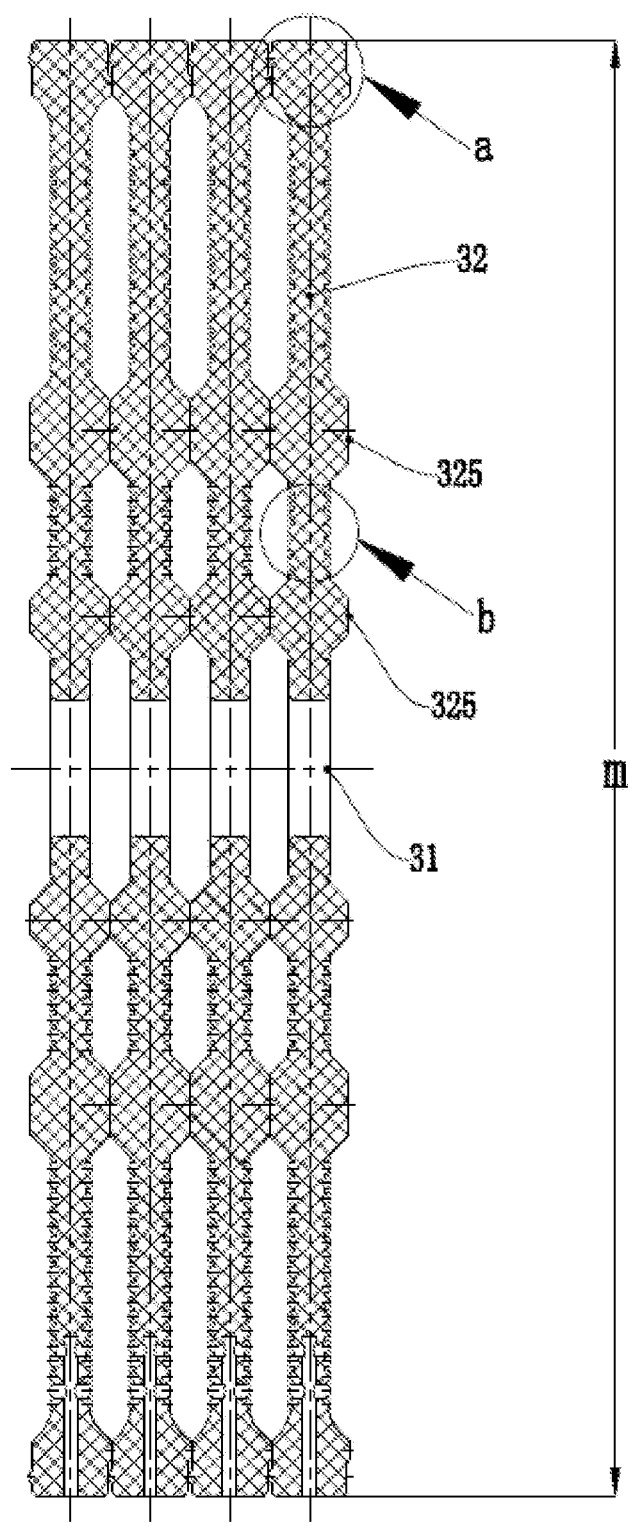
FIG. 2 shows plural filter plates pressed together.
Figure 3:
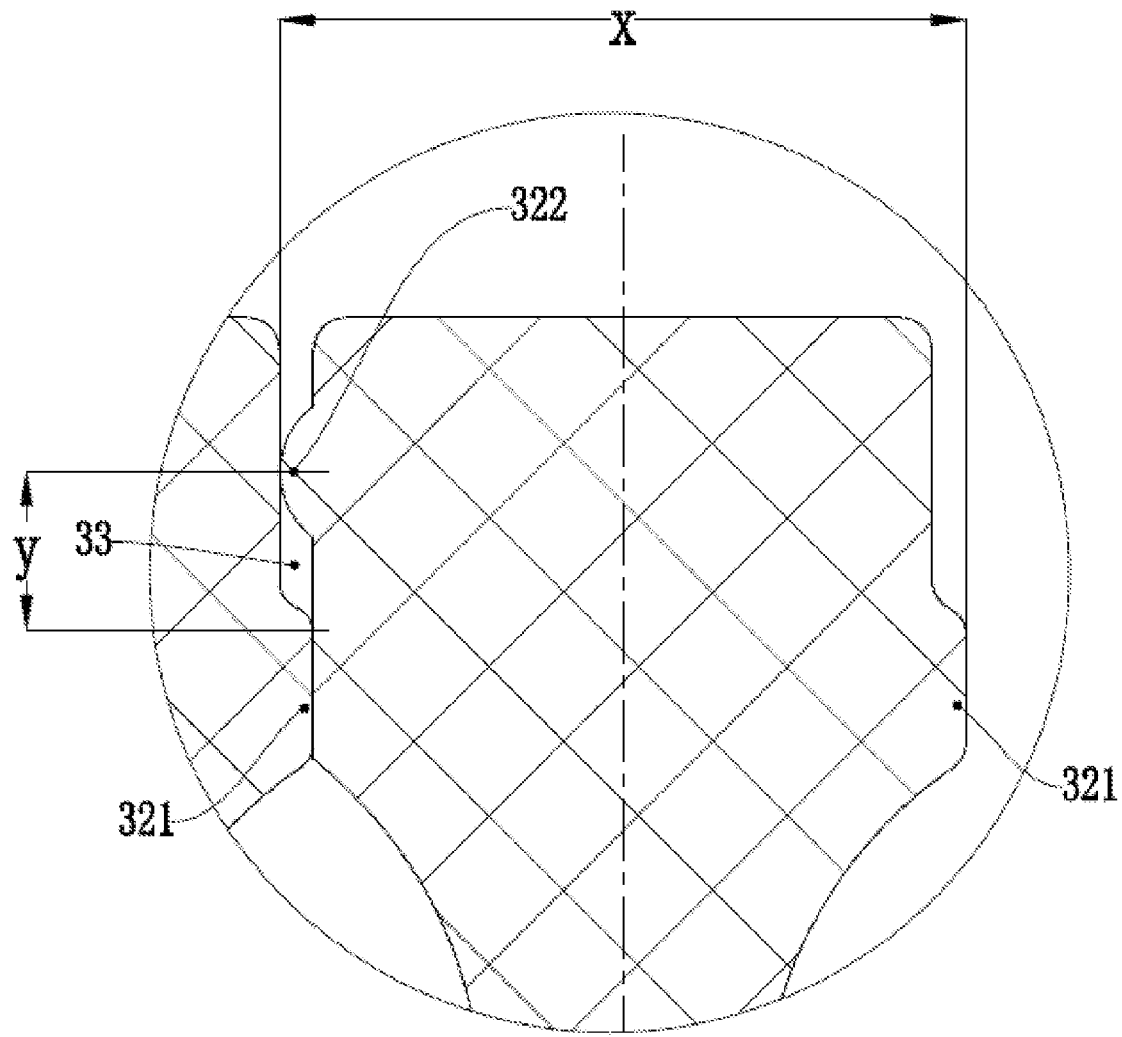
FIG. 3 is a partial, enlarged view of Area a of FIG. 2, particularly showing the vacant space and therearound.
Figure 4:
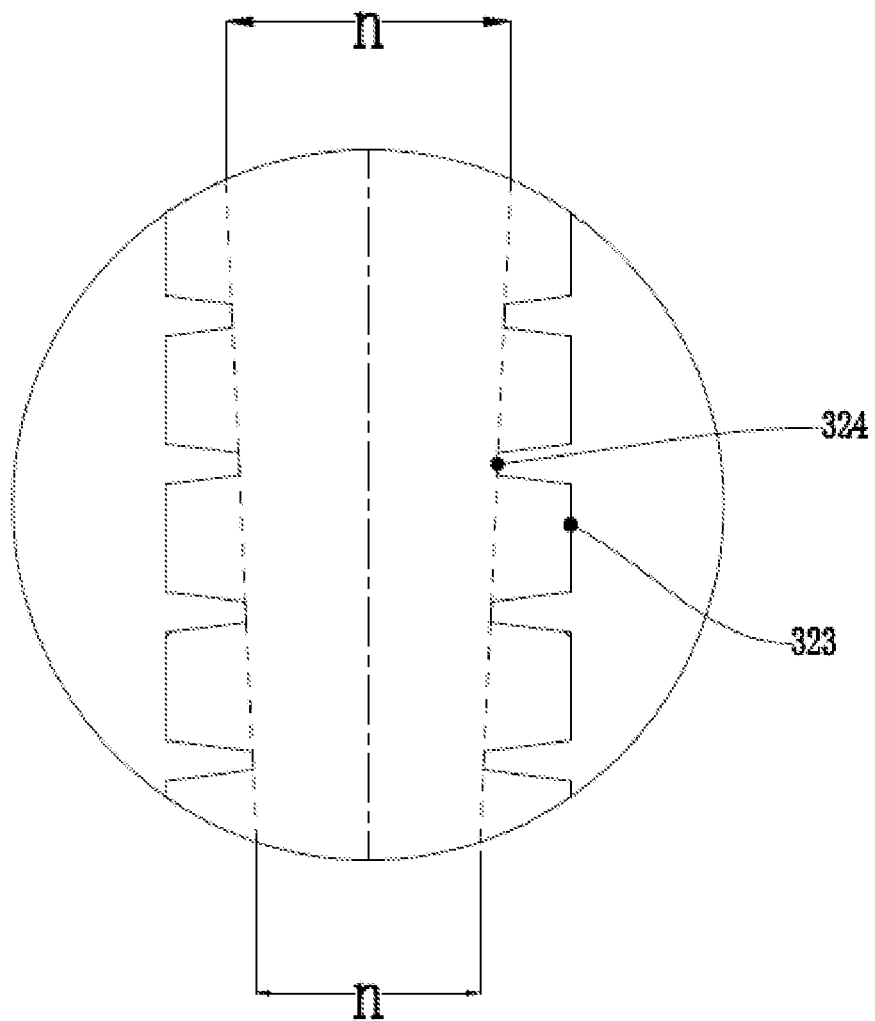
FIG. 4 is a partial, enlarged view of Area b of FIG. 2, particularly showing the base level and columnar protrusions of the filter plate.

In the present embodiment, each of the filter plates 3, as shown in FIG. 2 through FIG. 4, has two ends (sides) of its plate body 32 peripherally provided with different ridges each formed as a closed loop. When two adjacent filter plates 3 are pressed together, the ridges at the contacting surfaces of the plate bodies 32 are offset to jointly define a vacant space 33 therebetween. The plate body 32 may be round or square. For a round plate body, the ridge is in the form of a circular raised edge. For a square plate body, the ridge is in the form of a square raised edge. The term "closed loop" related to the ridge refers to that the ridge is an endless loop running near the periphery of either side of the plate body 32 of the filter plate 3. In some prior-art devices, the adjacent filter plates are each peripherally provided with a rubber seal ring. In other prior-art devices, the filter plate has one side formed with a looped ridge and the other side formed with a matching circular groove. These existing designs seem capable of providing sealing effects, but are not so in practical use. When the solid leach residue formed as filter cakes is removed from the pressure filter, it is often that some residue remaining at the sealing structure between the adjacent filter plates, and this residue can cause the sealing structure to fail for the next session of pressing operation. The present disclosure creatively suggests two different loop-like ridges at two reverse sides of the plate body 32, wherein when two filter plates 3 are pressed together, the ridge at the front of one filter plate 3 and the ridge at the back of the other filter plate 3 are offset and jointly define a vacant space 33 with a predetermined volume (as shown in FIG. 3). Therefore, in the event that some residue remaining at the sealing structure between the adjacent filter plates 3, when the filter plates 3 once again pressed together, the vacant space 33 serves to accommodate a certain amount of residue, thereby preventing the residue from breaking the sealing condition between the filter plates 3.

Furthermore, the ridge at one side of the plate body 32 has a flat top surface 321, while the ridge at the other side of the plate body 32 has a pointy or curved top surface 322. The flat top surface 321 has surface contact with the other filter plate 3, so as to provide good sealing effects. The pointy or curved top surface 322 is designed to easily push the residue away where the ridge presses on the other plate body 32, thereby preventing the residue from standing in the way of the sealing structure and causing leakage.

When the filter plates 3 are pressed together, the top surface 321 and the pointy or curved top surface 322 of the ridges of the adjacent filter plates 3 form a closed vacant space 33. The disclosed design substantially provides double sealing that has improved sealing effects. The ridge at one side and the ridge at the other side of a filter plate, when working with those matching structures on another filter plate, form an inner-circle sealing and an outer-circle sealing, respectively, between which the vacant space 33 for receiving any potential residue is defined.

In the present embodiment, the inner ridge has the top surface 321, and the outer ridge has the pointy or curved top surface 322. The top surface 321 has surface contact with the adjacent plate body 32, so as to provide good sealing effects. For this reason, it is assigned to the inner-circle sealing for primarily withstand the pressure from the drainage. The pointy or curved top surface 322 is assigned to the outer-circle sealing for providing further sealing effects when secondarily withstand the pressure from the drainage.

The vacant space 33 has a width y of 3 mm-5 mm. A larger width may weaken the strength of the structure and degrade the sealing effects. A smaller width may be sooner packed by the residue and losing sealing capability. The width y of the vacant space 33 refers to a difference between the innermost radius and the outermost radius of the vacant space 33, as illustrated in FIG. 3.

Figure 5:
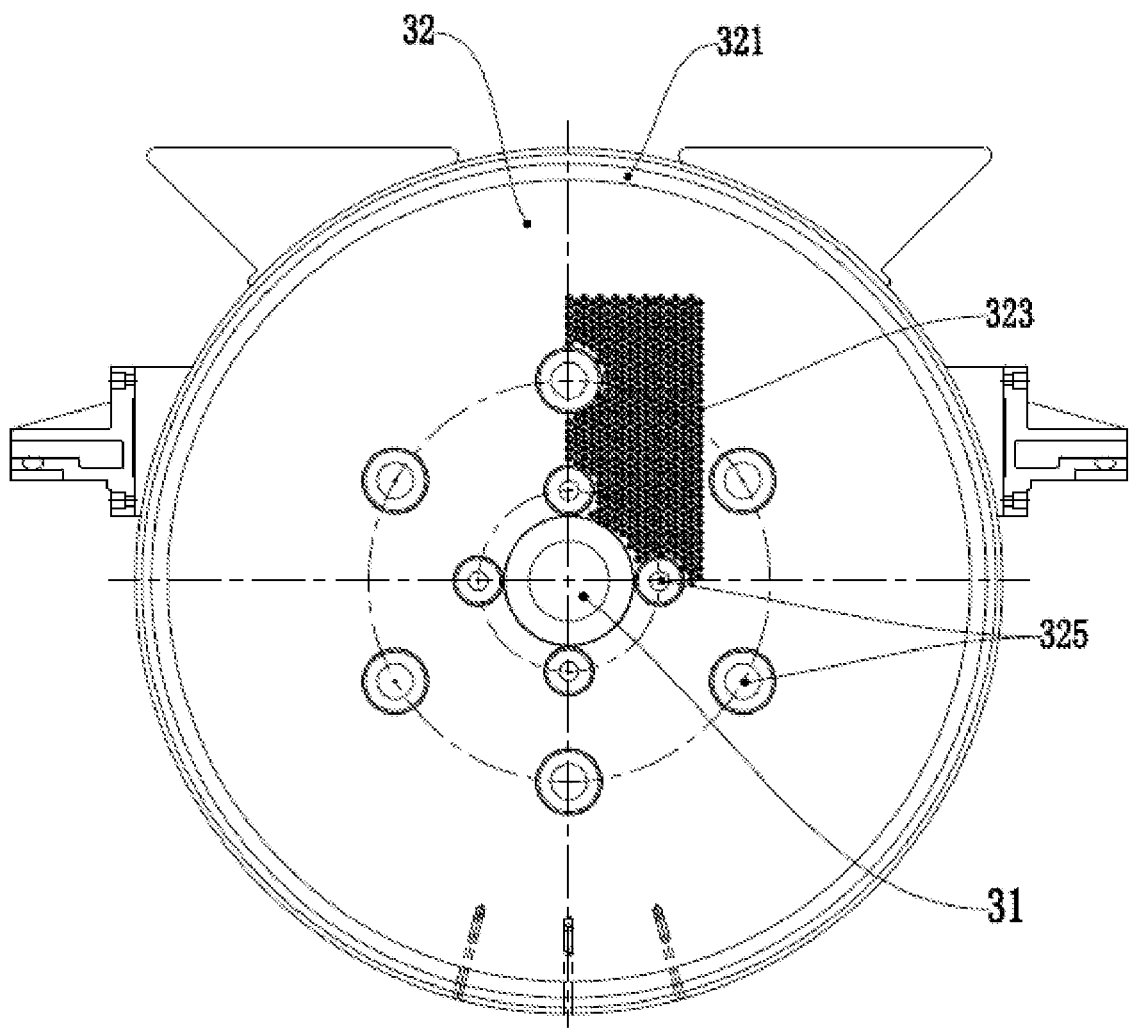
FIG. 5 is a front view of the filter plate of the present disclosure.

At each side of the plate body 32, columnar protrusions 323 are evenly distributed all over the area circled by the ridge although there are only some shown in FIG. 5 for the clarity of illustration. Referring to FIG. 4, all of the columnar protrusions 323 have their top surfaces level with each other. A base level 324 of the plate body 32 from which the columnar protrusions 323 are extended outward becomes thicker as it goes toward the periphery of the plate body 32, and the columnar protrusion 323 near the periphery of the plate body 32 has a height smaller that of the columnar protrusion 323 far away from the periphery of the plate body 32. The columnar protrusions 323 have their top surfaces level with each other, so as to press the solid leach residue between the filter plates 3 in to a cake that has an even thickness and is therefore easy to separate from the pressure filter.

Moreover, at each side of the plate body 32, braces 325 are radially arranged. When the two filter plates 3 are pressed together, the corresponding braces 325 on the adjacent plate bodies 32 press against each other. The braces 325 serve to prevent the large-sized filter plates 3 from swaying when receiving strong pressure from drainage.

The braces 325 are grouped into an inner circle and an outer circle depending on their radial positions on the plate body 32. The inner circle contains four braces 325, whose diameter ranges between 30 mm and 50 mm. The outer circle contains six braces 325, whose diameter ranges between 50 mm and 70 mm.

The diameter of the outer circle of the braces 325 is 40-60% of the diameter of the filter plate 3, and the diameter of the inner circle of the braces 325 is 20-30% of the diameter of the filter plate 3. The braces 325 serve to prevent the filter plate 3 from swaying under extreme pressure from the drainage. Since such sway tends to happen at the central part of the filter plate 3, the inner and outer circles of braces 325 can more effectively ensure stability of the filter plate 3 during the filtering process.

In the present embodiment, the filter plate 3 is round and has a diameter m of 0.6 m-1.2 m. The thickness n of the base level of the filter plate 3 is 30 mm-40 mm. The maximum thickness x of the filter plate 3 is 50 mm-70 mm. The maximum thickness x of the plate body 32 refers to the maximum distance between top surfaces of the ridges at two sides of the plate body 32.

The present disclosure has been described with reference to the preferred embodiments and it is understood that the embodiments are not intended to limit the scope of the present disclosure. Moreover, as the contents disclosed herein should be readily understood and can be implemented by a person skilled in the art, all equivalent changes or modifications which do not depart from the concept of the present disclosure should be encompassed by the appended claims.

What is claimed is:

1. A pressure filter, comprising:
   a hydraulic device and a pressing device forming an assembly, and
   at least two filter plates,
      wherein a guide beam spans across the hydraulic device and the pressing device and has a first end thereof fixed at a first end of the assembly of the hydraulic device and the pressing device, and has a second end of the assembly of the hydraulic device and the pressing device,
      the hydraulic device having a front end provided with a piston rod,
      the piston rod being movably mounted on the guide beam,
      the piston rod having a front end connected to a push plate, the at least two filter plates being tandem mounted on the guide beam as a group so that the push plate is located at a first end of the group of filter plates and the pressing device is located at a second end of the group of filter plates, and the pressure filter being characterized in that the pressing device is provided with a first feed inlet, and the push plate is provided with a second feed inlet, wherein each of the at least two filter plates has a material through hole, and the adjacent two filter plates are connected end to end so that the material through holes jointly form a material channel and the first and second feed inlets are both communicated with the material channel;

wherein each of the at least two filter plates has two sides thereof peripherally provided with different ridges each ridge formed as a closed loop, so that when two adjacent of said at least two filter plates are pressed together, the ridges at contacting sides of the adjacent pressed together filter plates are offset to jointly define a vacant space there between;

wherein at each of the sides of the at least two filter plates, columnar protrusions are evenly distributed all over an area circled by the ridge, and all of the columnar protrusions have top surfaces thereof level with each other, wherein a base level of the at least two filter plates from which the columnar protrusions are extended outward becomes thicker as it goes toward a periphery of the at least two filter plates, and the columnar protrusion near the periphery of the at least two filter plates has a height smaller than a height of the columnar protrusion far away from the periphery of the at least two filter plates.

2. The pressure filter of claim 1,
wherein the first feed inlet extends horizontally, and the second feed inlet extends vertically from above to the material through hole.

3. The pressure filter of claim 1,
wherein the first feed inlet and the second feed inlet are each provided with a valve.

4. The pressure filter of claim 1,
wherein the ridge at one of the sides of the at least two filter plates has a flat top surface and the ridge at the other side of the at least two filter plates has a semi-circle shape surface.

5. The pressure filter of claim 4,
wherein when two of said at least two filter plates are pressed together, the vacant space formed between the flat top surface of the ridge of one of the filter plates and the semi-circle shape top surface of the ridge of the other filter plate is closed, wherein the ridge having the flat top surface forms an inner-circle sealing and the ridge having the semi-circle shape top surface forms an outer-circle sealing.

6. The pressure filter of claim 1,
wherein the vacant space has a width ranging between 3 mm and 5 mm, and braces are radially arranged over each of the sides of the at least two filter plates, so that when two said filter plates are pressed together, the corresponding braces on the adjacent filter plates press against each other.

7. The pressure filter of claim 6,
wherein the braces are grouped into an inner circle and an outer circle depending on radial positions thereof on the at least two filter plates, wherein the inner circle contains four said braces, whose diameter ranges between 30 mm and 50 mm, and the outer circle contains six said braces, whose diameter ranges between 50 mm and 70 mm.

8. The pressure filter of claim 6,
wherein a diameter of the outer circle of the braces is 40-60% of a diameter of the at least two filter plates, and a diameter of the inner circle of the braces is 20-30% of the diameter of the at least two filter plates.

9. A pressure filter, comprising:
a hydraulic device and a pressing device forming an assembly, and
at least two filter plates,
wherein a guide beam spans across the hydraulic device and the pressing device and has a first end thereof fixed at a first end of the assembly of the hydraulic device and the pressing device, and has a second end of the assembly of the hydraulic device and the pressing device, the hydraulic device having a front end provided with a piston rod, the piston rod being movably mounted on the guide beam, the piston rod having a front end connected to a push plate, the at least two filter plates being tandem mounted on the guide beam as a group so that the push plate is located at a first end of the group of filter plates and the pressing device is located at a second end of the group of filter plates, and the pressure filter being characterized in that the pressing device is provided with a first feed inlet, and the push plate is provided with a second feed inlet, wherein each of the at least two filter plates has a material through hole, and the adjacent two filter plates are connected end to end so that the material through holes jointly form a material channel and the first and second feed inlets are both communicated with the material channel;

wherein each of the at least two filter plates has two sides thereof peripherally provided with different ridges each ridge formed as a closed loop, so that when two adjacent of said at least two filter plates are pressed together, the ridges at contacting sides of the adjacent pressed together filter plates are offset to jointly define a vacant space there between;

wherein at each of the sides of the at least two filter plates, columnar protrusions are evenly distributed all over an area circled by the ridge, and all of the columnar protrusions have top surfaces thereof level with each other for making it possible to separate a solid leach residue from the pressure filter, wherein a base level of the at least two filter plates from which the columnar protrusions are extended outward becomes thicker as it goes toward a periphery of the at least two filter plates, and the columnar protrusion near the periphery of the at least two filter plates has a height smaller than a height of the columnar protrusion far away from the periphery of the at least two filter plates.

* * * * *